UNITED STATES PATENT OFFICE.

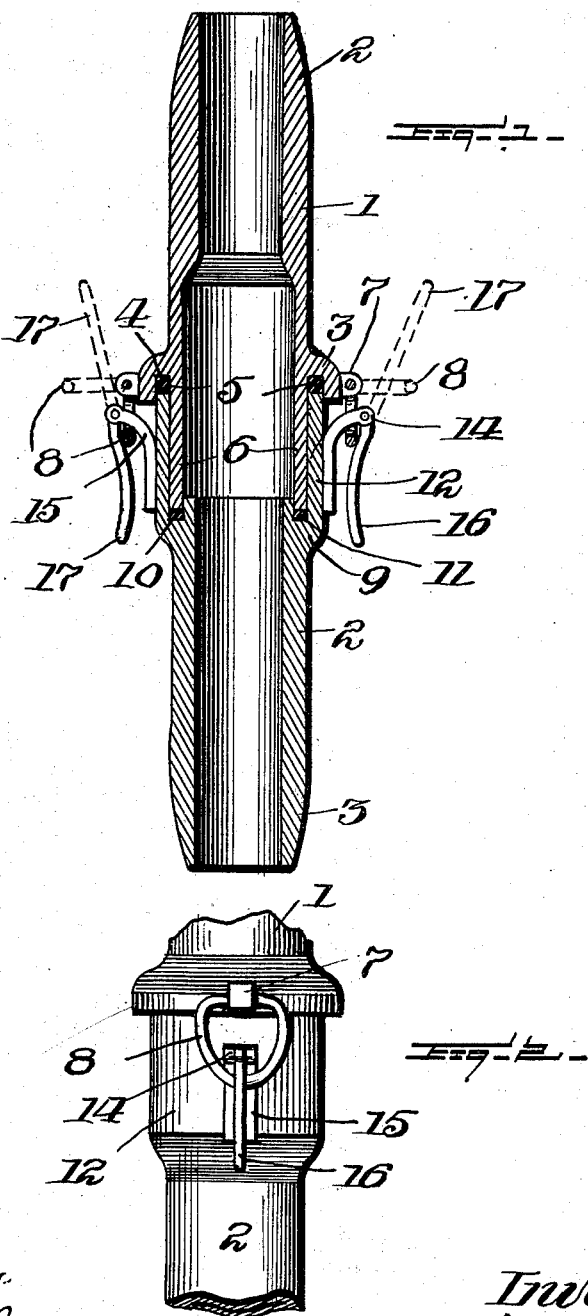

HOWARD GRUBBS, OF PITTSBURG, PENNSYLVANIA.

HOSE-COUPLING.

SPECIFICATION forming part of Letters Patent No. 714,476, dated November 25, 1902.

Application filed July 1, 1902. Serial No. 113,949. (No model.)

*To all whom it may concern:*

Be it known that I, HOWARD GRUBBS, a citizen of the United States of America, residing at Pittsburg, in the county of Allegheny and State of Pennsylvania, have invented certain new and useful Improvements in Hose-Couplings, of which the following is a specification, reference being had therein to the accompanying drawings.

This invention relates to certain new and useful improvements in hose-couplers, and has for its object to provide a hose-coupler that will be water-tight and one wherein no time is lost in coupling the same together.

A still further object of my invention is to provide a hose-coupler that will be extremely simple in construction, strong, durable, comparatively inexpensive to manufacture, efficient, and one which may be readily coupled by the most inexperienced person.

With the above and other objects in view the invention consists in the novel construction, combination, and arrangement of parts to be hereinafter more fully described, and specifically pointed out in the claim.

In describing the invention in detail reference is had to the accompanying drawings, forming a part of this specification, and wherein like numerals of reference indicate like parts throughout both views, in which—

Figure 1 is a longitudinal section of two sections of a hose coupled together. Fig. 2 is a side elevation of the same.

To put my invention into practice, I provide two sections 1 and 2, upon which are secured the rubber hose in any suitable manner. The section 1 has its forward end slightly tapered, as indicated at 2ª, for the reception of the rubber hose, while the other end carries a projecting collar 3, which is recessed at 4 for the reception of a rubber gasket 5, which is preferably square in cross-section. The inner face of this recess is formed by the periphery of the section 1, which carries extending ends 6, said ends extending beyond the collars. Diametrically opposite each other are lugs 7, which are carried by the collar 3, and suitably mounted in these lugs are the heart-shaped rings 8. The section 2 has its outer end beveled, as indicated at 3ª. 9 indicates a collar formed integral with the section 2 adjacent its inner end, said collar forming a recess or seat 10 to receive a rubber gasket, which is preferably square in cross-section, as indicated at 11. This collar 9 extends beyond the end of the section 2, as indicated at 12, this projecting collar seating in the recess 4 upon the rubber gasket 5, and the recess 10, carrying the rubber gasket 11, receives the inner end of the coupler-section 1.

Diametrically opposite each other are located hinges 14, which are suitably mounted upon the collar 12, these hinges projecting from the sides by their base being bent outwardly, as indicated at 15. Hinged upon the hinges 14 are the arms 16, which are curved inwardly, as indicated at 17.

The manner of coupling my improved hose-coupler is as follows: Having placed the sections 1 and 2 of the coupler together, so that their inner ends snugly fit within the recesses 4 and 10, respectively, the arm 16 is forced through the ring 8, as shown in dotted lines in Fig. 1, these arms engaging the ring as the two collars are brought together, when the ring is then turned inwardly toward the hose, and the arm 16 is bent backwardly against the collar 12, thus locking the ring behind the bent portion 15 of the hinge.

While I have shown the most practical embodiment of my invention, it is obvious that various changes may be made in the details of construction without departing from the general spirit of my invention.

Having fully described my invention, what I claim as new, and desire to secure by Letters Patent, is—

The combination with the coupler-sections, of collars carried by the said sections, said collars being of greater diameter than the said coupler-sections whereby annular recesses are formed, one of said recesses receiving the coupler end of the adjacent section, and the other receiving the free end of the collar of the other section, pivotally-mounted rings carried by one of the said collars, and hinged arms secured to the other of the said collars, said arms being received in the said rings, substantially as and for the purpose specified.

In testimony whereof I affix my signature in the presence of two witnesses.

HOWARD GRUBBS.

Witnesses:
JOHN NOLAND,
E. E. POTTER.